TOLL TICKETING SYSTEM REMOTE OPERATOR TRUNK

Filed March 14, 1958

INVENTORS.
JOHN E. OSTLINE
MAURICE H. ESPERSETH
BY C. A. Gulbrandsen
ATTY.

TOLL TICKETING SYSTEM REMOTE OPERATOR TRUNK

Filed March 14, 1958

INVENTORS.
JOHN E. OSTLINE
MAURICE H. ESPERSETH
BY
C. A. Gullbrandsen
ATTY.

TOLL TICKETING SYSTEM REMOTE OPERATOR TRUNK

Filed March 14, 1958 6 Sheets-Sheet 3

INVENTORS
JOHN E. OSTLINE
MAURICE H. ESPERSETH
BY C. A. Gullbrandsen
ATTY.

TOLL TICKETING SYSTEM REMOTE OPERATOR TRUNK

Filed March 14, 1958 6 Sheets-Sheet 4

INVENTORS.
JOHN E. OSTLINE
MAURICE H. ESPERSETH
BY C. A. Gulbrandsen
ATTY.

TOLL TICKETING SYSTEM REMOTE OPERATOR TRUNK

Filed March 14, 1958 6 Sheets-Sheet 5

INVENTORS.
JOHN E. OSTLINE
MAURICE H. ESPERSETH
BY C. A. Gulbrandsen
ATTY.

Dec. 15, 1959 J. E. OSTLINE ET AL 2,917,582

TOLL TICKETING SYSTEM REMOTE OPERATOR TRUNK

Filed March 14, 1958 6 Sheets-Sheet 6

*INVENTORS*
JOHN E. OSTLINE
MAURICE H. ESPERSETH
BY
C. A. Gulbrandsen
ATTY.

United States Patent Office 2,917,582
Patented Dec. 15, 1959

2,917,582

TOLL TICKETING SYSTEM REMOTE OPERATOR TRUNK

John E. Ostline, Elmwood Park, and Maurice H. Esperseth, Mount Prospect, Ill., assignors to General Telephone Laboratories, Incorporated, Northlake, Ill., a corporation of Delaware Application March 14, 1958, Serial No. 721,440

15 Claims. (Cl. 179—7.1)

The present invention relates in general to automatic telephone systems and more particularly to improvements in automatic toll ticketing telephone systems arranged to produce an individual record of the items of information pertinent to each toll telephone connection so that an appropriate charge may be assessed against the calling subscriber.

In prior automatic toll ticketing telephone networks of the type disclosed in the Ostline-Taugner patent application, Serial No. 650,508, filed April 3, 1957, toll ticketing telephone connections are established under the control of common equipment accessed by a code dialed into the local switch train by the calling subscriber. The common equipment usually includes a toll ticketer repeater, a calling line directory number detector, a translator and sender circuit to insure that the digits are properly dialed into the succeeding exchange and a tabulator with its associated daters and perforators to compile the data relating to the call and make a record of it. This system is also capable of another type of operation wherein the calling subscriber dials the called station number after accessing the equipment and his directory number is obtained by an operator that is called for by the common equipment. This operator then dials or keys the calling station identity into the ticketer of the main equipment. This type of ticketing equipment has met with great success when used in networks with offices of moderate size. To further increase the economies offered by systems of this general type, the equipment has been made so that the advantages of toll ticketing may be retained in such networks without requiring the maintenance of operators in the central ticketing office. This is performed by using a trunk line to an attended exchange terminated at both ends by specially designed repeaters which permit the operator to be called for in a manner similar to that outlined in the reference application. With such a remotely located operator the dual-type ticketer installed in a main office, can still be utilized for the processing of subscriber dial-toll calls from that office as well as from stations served by the branch office.

This new method of operation for direct distance dialing where the checking operator is stationed at an exchange remoted from the ticketing exchange is disclosed in this application. By remote control the distant operator located in an exchange maintaining twenty four hour operator service is connected into the ticketer of the main ticketing exchange for requesting the calling station number, just as if she were located at the ticketing exchange. In this way, it is now possible to economically provide customer toll dialing to relatively smaller exchanges or more sparsely settled areas. With this system, customer toll dialing equipment is installed in a central office initially, retaining its existing toll and tributary circuits. This permits direct outgoing toll service from the central exchange and tributary offices for all dialable traffic and permits inward dialing of all toll calls. These features substantially reduce the amount of traffic handled by the remote operator and favor the use of the remote operator exchange as the regular toll center with the amount of traffic requiring a back-haul thus sharply reduced.

When dialing is completed on a "D" system toll call, the calling party is signalled by a "zip-zip" tone, which indicates that an operator is on the line, ready to record the calling station number. Operating experience has shown that many subscribers in a system of this type give the station numbers immediately after hearing the "zip-zip" tone, without waiting for a request from the operator. If not, the operator will enter the connection and ask, "What is your number, please?"

"D" operator trunks normally are terminated in regular "D" positions located in the same office as the ticketing equipment. When a trunk is seized, the operator receives a signal, and picks up the trunk by operating a key. After verbally obtaining the number of the calling station, the operator "keys" the number into the ticketer associated with the call. If a keying error is made, a "correction" key is immediately operated, after which the number is again "keyed in." This operation is completed by the keying-in of the last digit (or a "sender-release" key may be provided); this releases the operator trunk and starts completion of the connection. (If the "D" operator trunks are terminated in existing "DSA" or toll manual positions, operation may differ slightly from this.) The operation of this disclosure for the operator is the same as if she was located in the ticketing office.

Accordingly, it is the main object of the present invention to provide an automatic toll ticketing telephone system for use in telephone networks including relatively remote small exchanges in which it is not economical to install any type of toll ticketing equipment but whose calls it is desired to ticket in a central ticketing office by means of its automatic ticketing equipment.

It is still another object of the invention to provide a trunk circuit for working in general with the toll ticketing repeater whereby calls routed from the ticketer to an operator may be routed to her even though she is located in a different exchange.

It is still another object of this invention to provide a trunk circuit whereby the functions of the remote operator may be carried out with only the use of a two-wire trunk.

Further objects and features of the present invention pertaining to particular arrangements of the various circuit elements of the automatic toll ticketing telephone system, whereby the above objects and additional operating features are attained.

The invention, both as to its arrangement and its operation together with the advantages thereof, will best be understood by reference to the following specification taken in connection with the accompanying drawings in which Fig. 1 discloses an operator's position equipment circuit similar to that disclosed in the Ostline-Taugner application referred to. Figs. 2 and 3 inclusive, illustrate in schematic form the details of the trunk circuit located in the distant operator office. Figs. 4 and 5 illustrate the details of the trunk circuit located in the central ticketing office.

Figure 1:
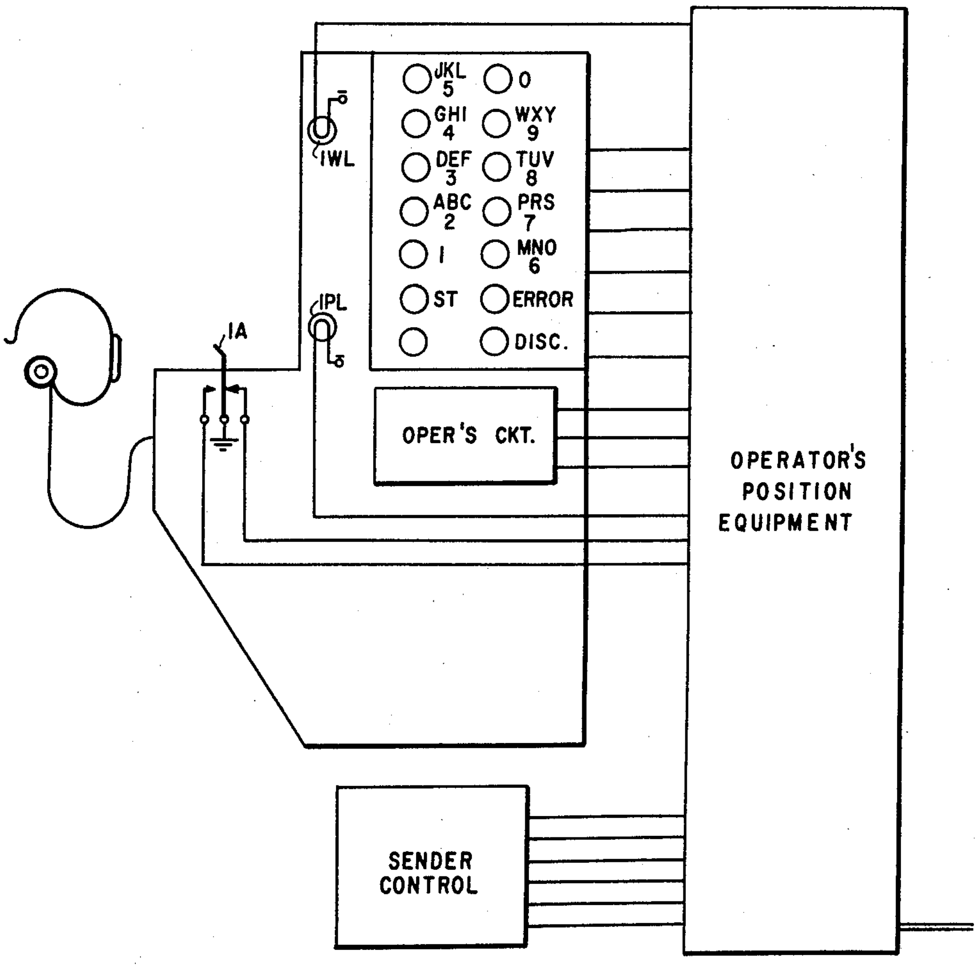

The general functions of the circuits involved in the processing of a type "D" call with the service of a remote operator follows.

The ticketer circuit 6T is seized from a selector on locally originated calls, and from an incoming selector on calls originating in a branch exchange having no directory number detecting equipment.

In this type of system, it is necessary to dial an access code to seize this circuit. The last digit of the access code is always the party identification digit "0" (zero). On locally originated calls, the party identification digit "0" is the first digit dialed into this circuit.

The principal functions of the Ticketer are as follows:

1. FUNCTION COMMON TO ALL CALLS (*a*) It calls for a Transender when seized.

(*b*) It repeats to the Transender the office code digits on seven or eight digit calls or the area code plus the office code digits (if needed) on ten or eleven digit calls.

(*c*) It absorbs those digits of the called number which are not required for sending.

(*d*) It provides for stop-dial and flashing signal supervision.

(*e*) After an adjustable "grace" period, it times the length of conversation from the time the called party answers until the calling party disconnects.

(*f*) It stores the following ticketing information during conversation: the calling number (7 digits); change of toll rates indication, if it occurs during the call.

(*g*) After the calling party has disconnected, it calls for a Tabulator and transfers to its the thicketing information. During this transfer operation, the Ticketer is guarded against seizure from another call, but the calling line and the outgoing trunk are released. The ticketer releases after transfer is completed.

2. FUNCTIONS OF THE TICKETER PERTAINING TO LOCAL ACCESS CALLS

The ticketer determines the party identity and calls for a detection of the calling party's number after the party identification digit "0" has been dialed, and provides for extending the call to a "D" operator should an incomplete detection occur.

3. FUNCTIONS OF THE TICKETER PERTAINING TO REMOTE ACCESS CALLS (TYPE "D" SERVICE)

It provides for extending the call to a "D" operator when the calling party has completed dialing the called number.

The operators trunk circuit 60TC functions to find the thicketer circuit requesting operator service from a group of ticketers. It then sizes the ticketer and through the operator's remote control circuit connects to the operator position. A pilot lamp is provided to supervise the operator's keying operations which are repeated to the ticketer. A signal tone is forwarded to the subscriber when this circuit is seized by the operator.

When the operator's start key is operated this circuit then releases automatically.

The operators remote control circuit of Figs. 2 to 5 provides "D" operator service over a two-wire trunk from a manual office to a distant ticketing center.

(1) It is seized from an operators trunk circuit when a ticketer calling for "D" service has been found.

Figure 2:
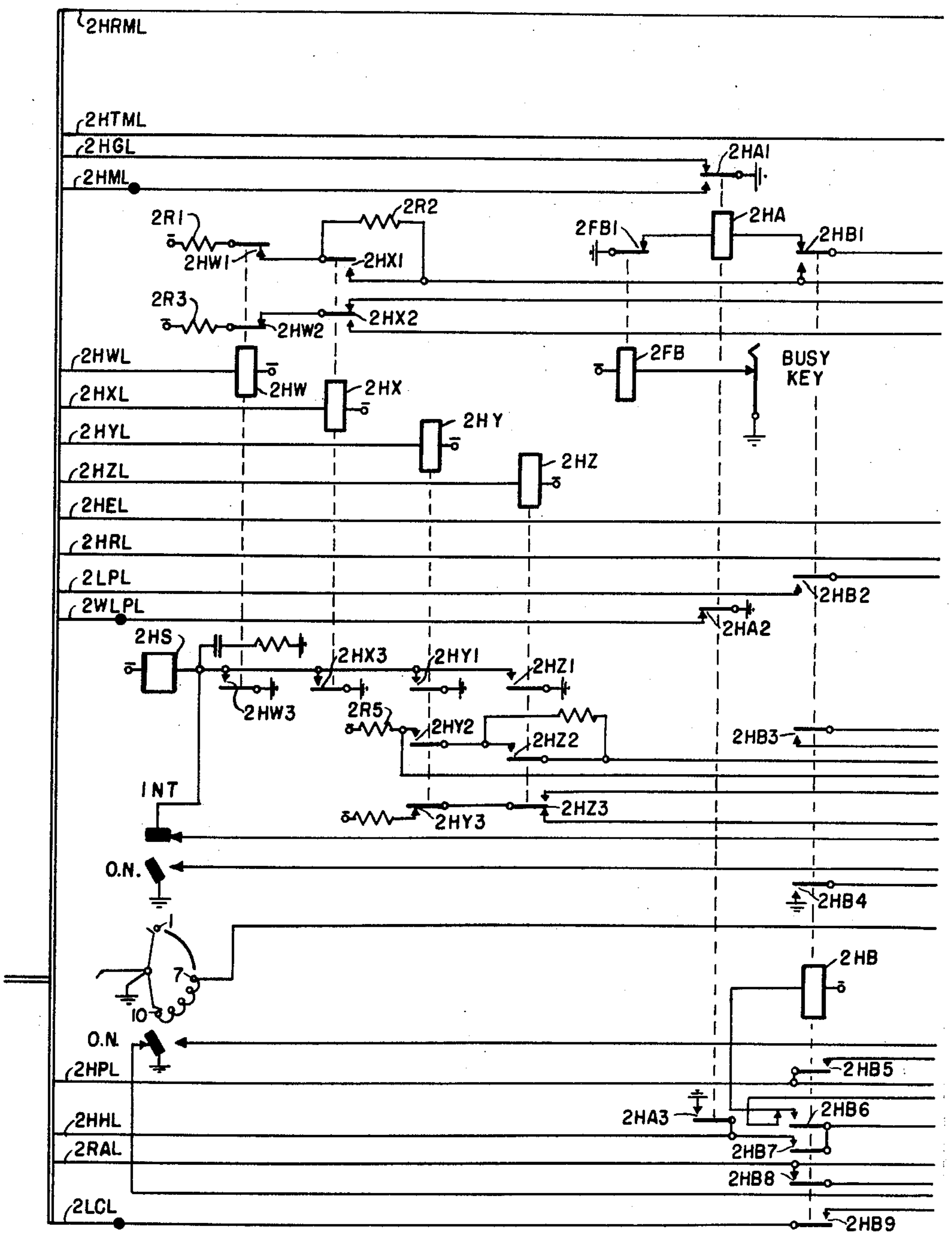
Figure 3:
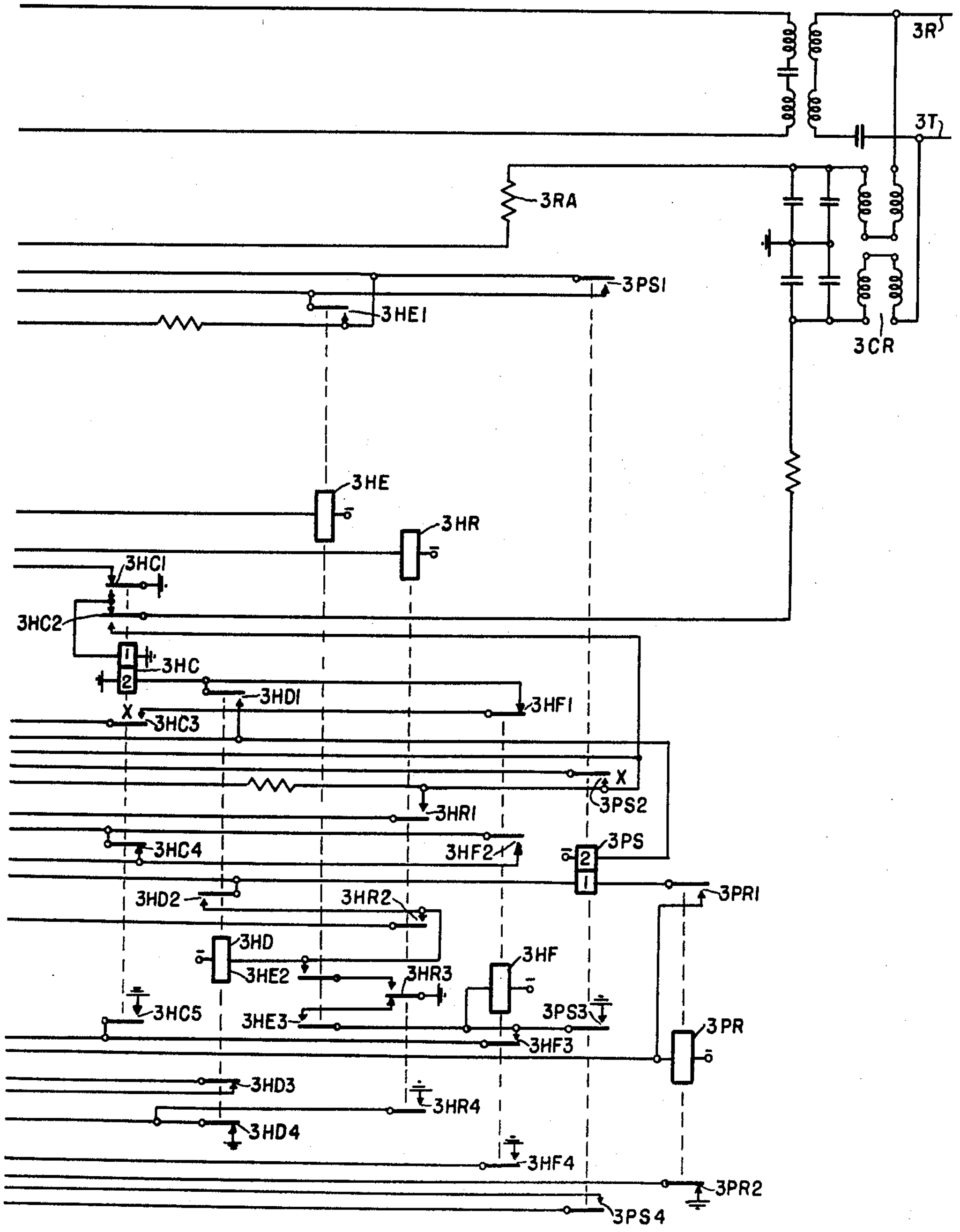

(2) Upon seizure at the manual end Figs. 1, 2 and 3, the Wait lamp in the operators position is lit.

(3) Supervision is provided over the tip side of trunk to control lamp Pilot that provides operator with start-stop keying indication.

(4) Provides a transmission path from the poerator's position equipment to the operator's trunk equipment.

(5). It utilizes two composite signalling legs to transmit supervisory signals and the twelve keyset combinations in the form of positive and negative, high and low battery pulses.

(6) A loop supervisory relay is provided to busy this circuit and the associated operator's trunk circuit if a fuse fails in either office or the loop is opened.

(7) The operator is provided with a forced release feature by the simultaneous operation of the Error and Start keys.

The functions of the operator's position equipment circuit 10P disclosed in block diagram form in Fig. 1 are;

(1) To connect a Ticketer Circuit to an individual operator via the Remote Operator's Trunk Circuit to provide "D" service to the Ticketer.

(2) Provides a "D" Wait lamp to signal a "D" call, a "D" Pilot lamp to mark the processing of the "D" call by the operator, and a "D" Accept key for the operator to accept the "D" call. These are face equipment.

(3) Provides a common allotter to prevent the same ticketer from being simultaneously seized by two or more operators.

(4) Extends the talking leads from the ticketer to the operator's headset, and the control leads to the position keyset.

The transender equipment consists of a transender hunter 6TH, transender coder 6C, transender sender 6S, transender codexer 6CX and the associated translator 6TR.

The tabulator equipment consists of a tabulator allotter, a tubulator circuit 6TL, a dater and timer circuit 6DT, a pulse and time interrupter 6TI and a tape perforator 6TP. The transender hunter circuit 6TH is associated with a ticketer 6T and its function is to find or hunt for an idle transender. The transender coder 6C is an integral part of the transender and as such operates in direct conjunction with the transender codexer 6CX and transender sender 6S.

One transender from a common pool is associated with a ticketer while the subscriber dials the called number. It is retained under control of the ticketer until it obtains a routing directive either from the common translator or from the built-in directive in its coder and until it completes the required sending. Upon completion of sending, the ticketer switches through and frees the transender for use on other calls.

The translator 6TR is a unit which is used in conjunction with the transenders for the purpose of supplying the transenders with the necessary routing directive as determined by the first three or six digits registered in the transender on its codexer. The translator is common to the transenders; it is seized only momentarily when a routing directive is required. The connection of the transender to the translator is controlled by the translator assigner. The transender and translator are described in greater detail in the Ostline, Coleman and Taugner application Serial No. 628,474 filed December 3, 1956.

The tabulator circuit's 6TL function is to forward toll call ticketing data to tape perforators. The toll call ticketing data consists of information received from the ticketer, the dater-timer, the radexer (if provided), and from the tabulator itself. The tabulator is described in greater detail in the Ostline application Serial No. 625,773 filed December 3, 1956.

*Detailed operation*

SEIZURE FROM LOCAL SELECTOR

When the calling subscriber at station 6SS1 removes his receiver, the usual loop circuit, including the line conductors is completed. In response to the completion of the above mentioned loop circuit, the line circuit initiates operation of the distributor and marks the terminals of the calling subscriber line in the bank contacts of a group of line finders, including the line finder 6LF1, having access to the calling subscriber line. For the purpose of this description it will be assumed that the distributor selects the line finder 6LF1 and that it operates its wiper in a vertical and then in a rotary direction in the well known manner to select the terminals in the associated bank terminating the calling line. When the calling line is found by the line finder 6LF1, it extends the calling line to the individually associated first selector 6LS1 and the latter selector transmits the usual dial tone signal to the calling subscriber to indicate that the dialing may be started. The above noted switching apparatus, including the line circuit, the distributor, the line finder and the first selector may be of conventional construction and arrangement and may be, for example, of the type illustrated in the Bakker Patent No. 2,289,896, granted July 14, 1942 and in the Saunders Patent No. 1,849,694, granted March 15, 1932.

Figure 6:
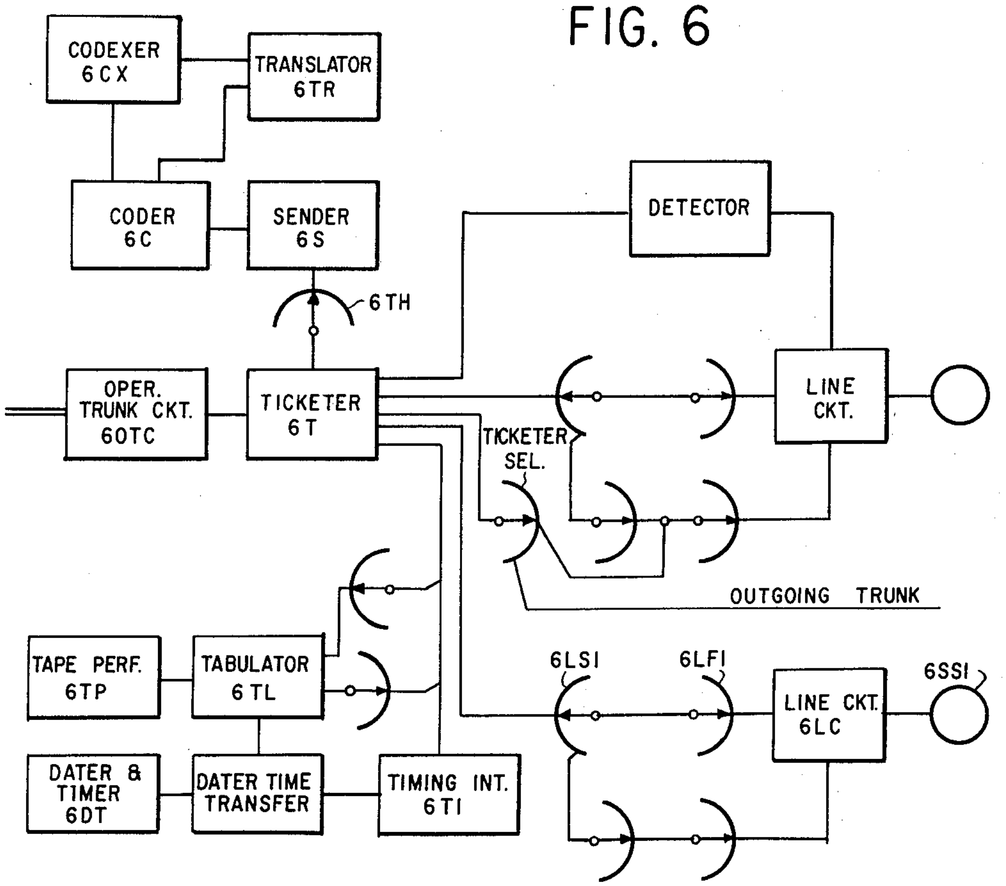
Fig. 6 illustrates in schematic block diagram form the switching equipment, the toll ticketing equipment and also shows two subscriber stations connected to the switching equipment.
Figure 7:
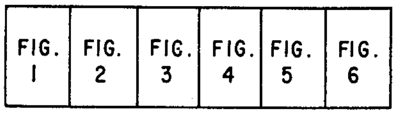
Fig. 7 illustrates the manner of combining Figs. 1 to 6 inclusive of the drawings to form a unified system.

To extend the connection to the ticketer circuit 6T, it is now necessary for the subscriber to dial the digit "9". Consequently, when the calling subscriber received the dialing tone signal the dial is to be actuated in accordance with the digit 9 to transmit nine loop impulses to the first selector 6LS1. This selector then raises its wipers in a vertical direction to the ninth level and then rotates its wipers over the selected level to search for an idle ticketer circuit, such as the ticketer circuit 6T of Fig. 6. It will be assumed for the purpose of this description that the first selector now extends the connection from the calling subscriber line to the ticketer circuit. If the ticketer circuit is busy, the control conductor will be grounded in order to indicate the busy condition to the first selector. Thus, as the selector rotates its wipers over the ninth level it will pass over contacts terminating ticketer circuits having grounded control conductors.

Figure 4:
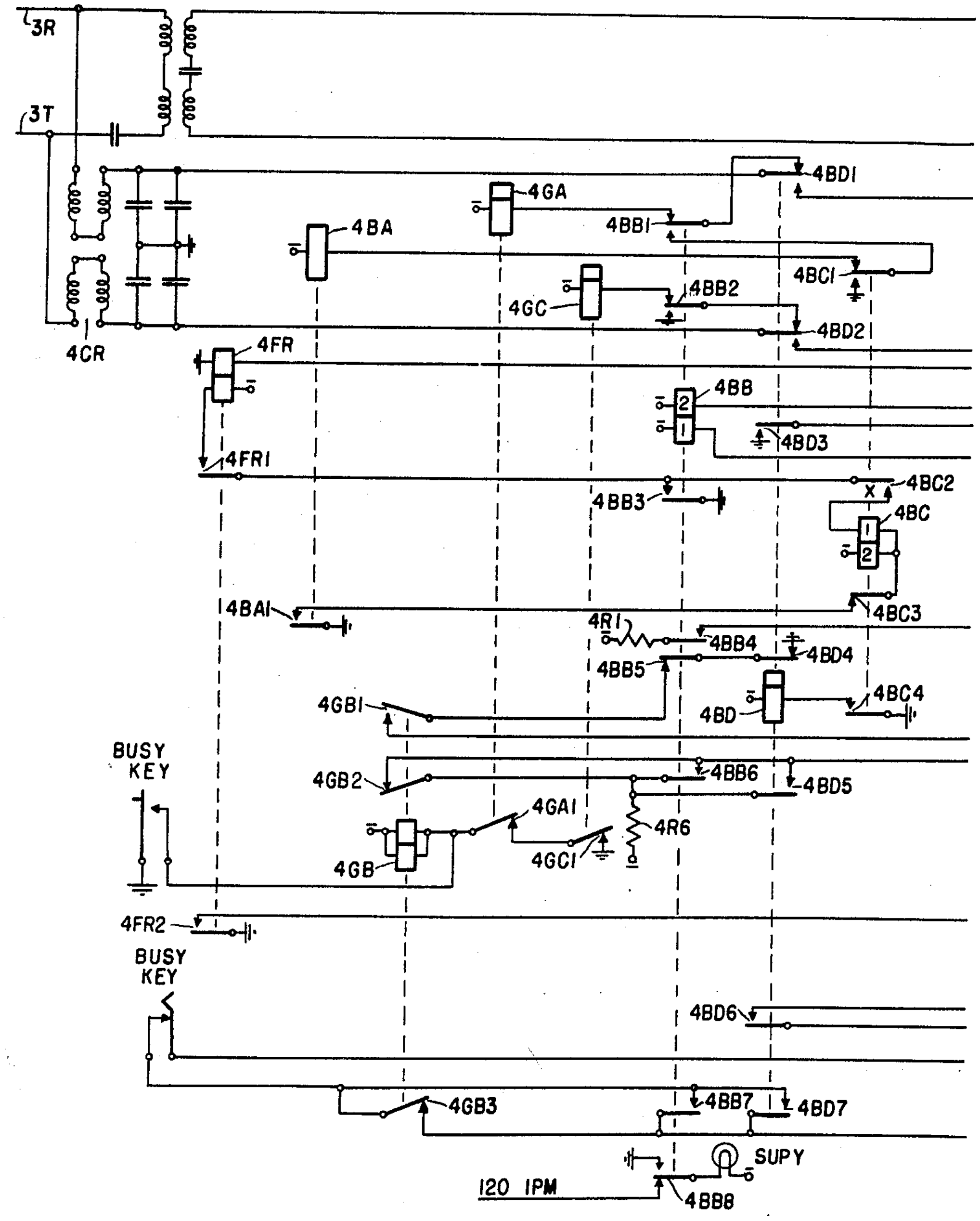
Figure 5:
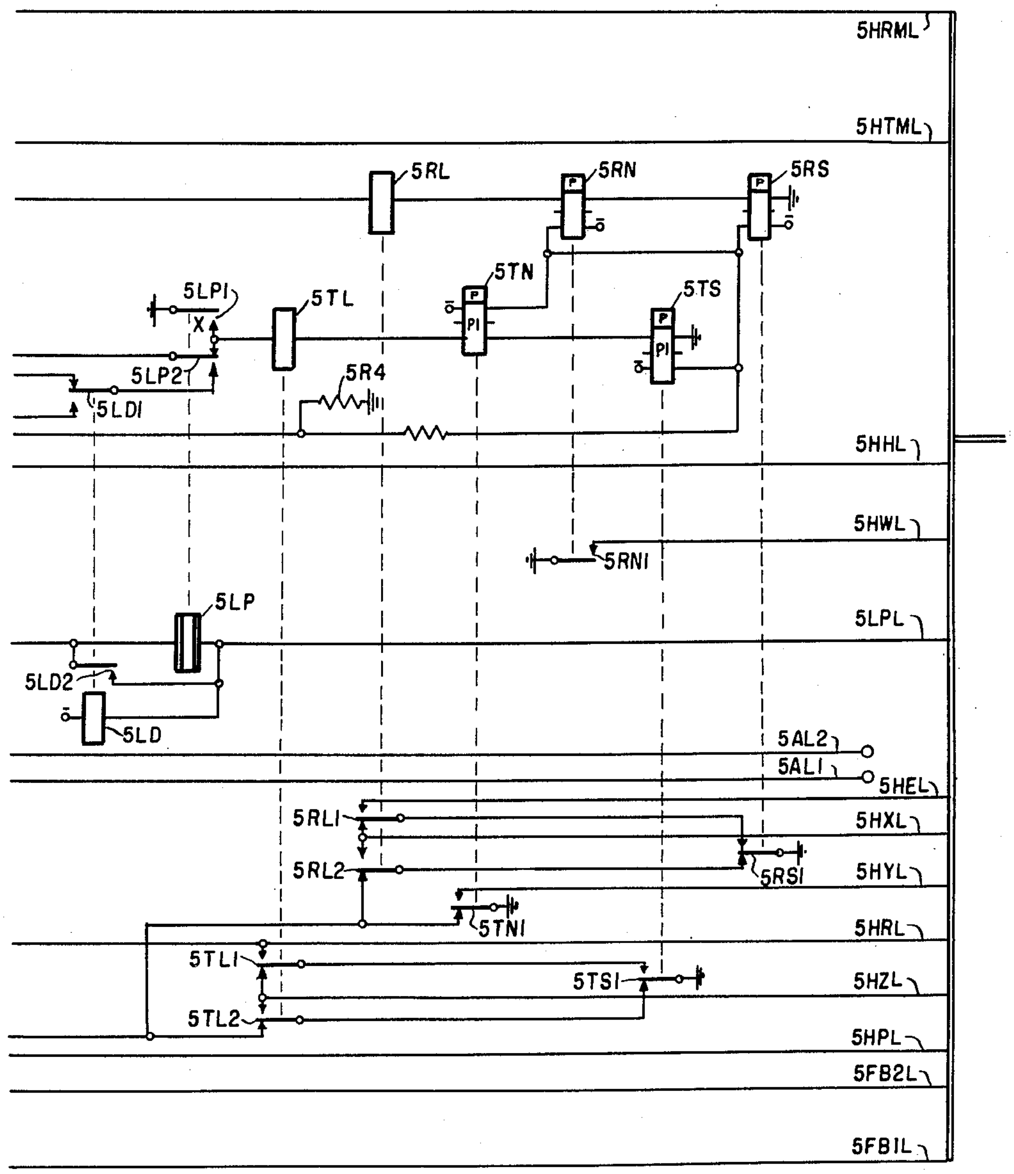

The ticketer 6T after completion of the dialing into the ticketer of the called station number extends the call through the operators trunk circuit such as 60TC to the remote operators control trunk circuit of Figs. 4 and 5.

SIGNALLING A TYPE D CALL

When the D operator's trunk circuit is connected with the calling ticketer, ground is closed to lead 5HH. Ground is normally on lead 5LP. Relay 4BB operates, opens the circuit to the winding of 4GA, closes ground to lead 3T, closes a circuit to the winding of relay 4BA to lead 3R, further opens the ground circuit from lead 5AL2, further connects lead 5FB1 to lead 5FB2, closes battery potential through resistance 4R1 to lead 5LP, closes ground to the supervisory lamp, further closes battery potential through resistance 4R6 to lead 5AL1 and prepares a ground potential to the number one winding of relay 4BC.

Relay 4GA restores and opens the circuit at contacts 4GA1 to relay 4GB. Relay 4GB restores, prepares a ground at contacts 4GB1 to lead 5AL2, prepares the opening of lead 5FB1 from lead 5FB2 at contacts 4GB3 and prepares for the removal of resistance battery from lead 5AL1 at contacts 4GB2. Relay 4BA operates from ground potential at contacts 2FB1 the winding of relay 2HA, back contacts 2HB1, balancing resistor 3RA, through the coils of composite equipment 3CR, through the trunk lead 3R through composite equipment coils 3CR, back contacts 4BD1, make contacts 4BB1, back contacts 4BC1. Upon operating relay 4BA closes a ground potential at contacts 4BA1 to the number two winding of relay 4BC. Relay 2HA operates, closes a ground potential to lead 2HH at contacts 2HA3, to 2WLPL at contacts 2HA2 and 2HM at contacts 2HA1 to the operator's position equipment and removes ground potential from lead 2HG at the back contacts 2HA1. Relay 4BC which is a two-step relay operates to its first step and closes ground potential to its number one winding. Relay 5LP operates, closes ground potential at contacts 5LP1 to relay 5TL and the P1 windings of relays 5TN and 5TS, it further opens the circuit to the relays 5TL, 5TN and 5TS from trunk lead 3T at the back contacts 5LP2, and prepares a multiple circuit to lead 3T at the make contacts 5LP2.

Ground on lead 2WLPL will light the wait lamp at the operator's position indicating that there is a "D" call requiring service. The operator, when she sees this signal, will depress and release the accept key, and the operator's position equipment will hunt for the operator's trunk circuit calling for service. This hunt is made on an absence-of-ground basis over the 2HG leads.

When the operator's control circuit finds the operator's trunk circuit, the operator's transmission circuit is extended to leads 2HRM and 2HTM, the operator's key set is extended to leads 2HR, 2HW, 2HX, 2HY, 2HZ, and 2HE, and ground potential is returned from the operator's accept key now released, to lead 2HP.

Ground potential via lead 2HP through contacts 3HD3, break contacts 2HB6 operates relay 2HB. Relay 2HB operates, locks, opens the series connection between relays 4HA and 4BA, prepares to close a —50 volt potential and +50 volt potential to lead 3R through a multiple circuit, closes ground potential at contacts 2HB2 to lead 2LP, prepares a locking path for relay 3HC at contact 3HB3 closes ground to the number one winding of relay 3PS and relay 3PR further closes ground to lead 2HH and closes ground to lead 2RA. Relay 4BA restores and removes shunt to the number one winding of relay 4BC, relay 2HA restores, removes ground potential from lead 2WLPL and transfers ground potential from lead 2HM to lead 2HG. Relay 3PR operates, locks, removes ground from lead 2RA at contacts 3PR2 and prepares a circuit to the number one winding of relay 3PS at contacts 3PR1. Relay 3PS does not operate at this time due to its number one winding being shunted. Relay 4BC operates completely on both windings in series, opens its operating path, closes ground potential to lead 3R and closes a circuit to relay 4BD. Relay 4BD operates, closes relays 5RL, 5RN and 5RS to lead 3R at contacts 4BD1, closes a circuit to the number one winding of relay 4FR at the make contacts 4BD2 to lead 3T, shunts resistor 5R4 at contacts 4BD3, further opens ground at contacts 4BD4 from lead 5AL2, further closes lead 5FB1 to lead 5FB2 at contacts 4BD7, closes resistance battery at contacts 4BD5 to lead AL1 and closes ground to lead 5HP at contacts 4BD6.

Ground on lead 2LP will light the pilot lamp at the operator's position. Removal of ground from lead 2WLPL will extinguish the wait lamp and the auxiliary wait lamp at the operator's position.

When the operator's trunk circuit receives ground over lead 4HP, a zip-zip tone is closed to lead 5HRM and 5HTM and transmitted to the operator's position equipment through leads 2HRM and 2HTM. When the zip-zip tone is transmitted to the operator, the ticketer will check for the origin of the call. If the call comes from a paystation, the operator will receive a paystation tone through leads 2HRM and 2HTM.

After a time interval, ground is removed from lead 5LP. Relay 5LD operates, shunts relay 5LP, and transfers lead 3T from the number one winding of relay 4FR to the number two winding of relay 4BB at its make contacts 5LD1. Relay 4HC operates on battery through the number two winding of relay 4BB, and locks through its number two winding to the number two winding of relay 3PS, short circuits its number one winding at make contacts 3HC1, prepares to close the —50 volt potential to lead 3T at make contacts 3HC2, removes grounds from lead 2LP at its break contacts 3HC1, prepares a locking circuit to relay HCF at contacts 3HC5 and further opens ground to the rotary switch interrupter springs at contacts 3HC4. Relay 5LP restores, removes ground from the operate circuits to relays 5TL and the P1 windings of relays 5TN and 5TS, and transfers lead 3T from the number two winding of relay 4BB to relay 5TL and the P1 windings of relays 5TN and 5TS at its back contacts 5LP2. Removal of direct ground on lead 2LP will dim the pilot lamp at the operator's position.

REPETITION OF CLASS OF SERVICE TONE CHECK

If the operator wants to repeat class of service tone check, she momentarily operates the accept key. Ground is momentarily removed from lead 2HP. Relay 3PS operates in series with relay 3PR, prepares a circuit to lead 2LC, closes a ground to relay 3HF, and closes +50 volts through resistor 2R3 to lead 3R at contacts 3PS1 and −50 volts through resistor 2R5 to lead 3T at contacts 3PS2. Relay 3HF operates from the ground at relay 3PS3, locks, opens the holding path to relay 3HC at its contacts 3HF1, closes ground to lead 2RA at its contacts 3HF4 and if switch 2HS is off-normal, closes a circuit to switch 2HS through its interrupter springs. Switch 2HS steps self-interrupted to its normal position and the off-normal springs restore closing ground to lead 2LC to light an originating office indicating lamp. Relay 3HC restores, removes −50 volts potential through resistor 2R5 from lead 3T, closes its number one winding to lead 3T, closes direct ground to lead 2LP, closes a multiple circuit to rotary switch 2HS and removes a multiple holding ground to relay 3HF. Before relay 3HF restores, relays 5TL, 5RL, 5TN, and 5RS operate and remove ground from lead 5HP to signal the ticketer that a repetition of class of service tone is wanted. When the operator restores her accept key, ground is closed to lead 2HP. Relay 3PS restores, opens lead 2LC to extinguish the originating lamp, removes the high voltages from lead 3R, and opens the circuit to relay 3HF. Through the restoration of relay 3PS or the restoration of the off-normal springs on rotary switch 2HS will release relay 3HF. Relay 3HF restores, prepares a holding path for relay 3HC, further opens a path to rotary switch 2HS and removes ground from lead 2RA. When the high voltages on leads 3T and 3R were removed, relays 5TL, 5RL, 5TN and 5RS restore and close ground from lead 5HP. Class of service tone will be transmitted to the operator through leads 3T and 3R as previously explained.

Ground is closed to lead 5LP. Relay 5LD restores, opens the short circuit to relay 5LP and prepares a connection of the number one winding of relay 4FR to lead 3T. Relay 5LP operates as previously explained.

Ground is again removed from lead 5LP when the class of service tone check is completed. Relay 5DL operates as explained previously. Relay 5LP restores as previously explained. After relay 5LD has operated, after the release time of relay 5LP which is slow-to-release, resistance battery through the number two winding of relay 4BB is closed to the number one winding of relay 3HC through lead 3T. Relay 3HC operates as previously explained. The dimming of the pilot lamp at the operator's position indicates that the ticketer is again ready to receive digits.

REPETITION OF KEY-SET OPERATIONS TO THE OPERATOR'S TRUNK CIRCUIT

When the operator receives the zip-zip tone and the pilot lamp is dimmed, she is notified that her head set is connected through to the subscriber. The operator acquires the calling station number verbally and will repeat this number from her key-set as grounds on leads 2HW, 2HX, 2HY, and 2HZ. Composite equipment is provided in this circuit to derive two signalling legs to pass the necessary information. The 12 key-set marks and the two step controls are marked on the legs as follows:

| Keyset Mark | Input and Output Leads | Marking Current on Line | | | | Relays Operated |
|---|---|---|---|---|---|---|
| | | Positive | | Negative | | |
| | | High | Low | High | Low | |
| 1 | 2HWL, 2HXL | | | 3R | | 5RN, 5RL. |
| 2 | 2HWL, 2HYL | | | | 3T, 3R | 5RN, 5TN. |
| 3 | 2HWL, 2HZL | | 3T | | 3R | 5RN, 5TS. |
| 4 | 2HXL, 2HYL | | 3R | | 3T | 5RS, 5TN. |
| 5 | 2HXL, 2HZL | | 3R, 3T | | | 5RS, 5TS. |
| 6 | 2HYL, 2HZL | | | 3T | | 5TN, 5TL. |
| 7 | 2HWL | | | | 3R | 5RN. |
| 8 | 2HXL | | 3R | | | 5RS. |
| 9 | 2HYL | | | | 3T | 5TN. |
| 0 | 2HZL | | 3T | | | 5TS. |
| Error | 2HEL | 3R | | | | 5RS, 5RL. |
| Start | 2HRL | 3T | | | | 5TS, 5TL. |
| E, ST | 2HEL, 2HRL | 3R, 3T | | | | 5RS, 5RL. 5TS, 5TL. |
| Accept Key | 2HPL | 3R | | 3T | | 5RS, 5RL. 5TN, 5TL. |

As the various relays 2HW, 2HX, 2HY, and 2HZ operate they close a ground in multiple to the magnet of rotary switch 2HS which steps once after each digit, and the 5TN, 5RN, 5TS and 5RS relays operate and close ground to the respective 5HW, 5HX, 5HY, and 5HZ leads. On the first step the off-normal springs of rotary switch 2HS operate. After the seventh (final) digit is keyed, rotary switch 2HS advances to bank terminal seven and prepares a ground to relay 3HD.

RELEASE

The operator depresses and releases the start key at the key-set and ground is closed through lead 2HR to relay 3HR. Relay 3HR operates momentarily, closes a circuit to relay 3HD, closes high positive voltage to lead 3T and closes a multiple holding path to relay 2HB. A relay 3HD operates, locks, opens the operating path to relay 2HB, opens a multiple holding path to relay 2HB and closes a multiple holding path to relay 3HC. Relays 5TL and 5TS operate and close ground to lead 5HR. When the operator releases the start key, ground is removed from lead 2HR. Relay 3HR restores, removes high positive voltage from lead 3T, opens the operating path to relay 3HD, and opens the holding path to relay 2HB. Relays 5TL and 5TS restore and open ground potential from lead 5HR. Relay 2HB restores, completes a circuit from relay 2HA to lead 3R, removes resistance ground from lead 2LP, opens a holding path to relay 3HC, open a holding path to relay 3HD, opens the operating path to relay 3PR, prepares its own operating path, removes ground potential from lead 2HH, further opens ground from lead 2RA and removes ground from relay 3PR and the number one winding of relay 3PS. Relay 3HD restores, opens a holding path to relay 3HC and prepares the operating and holding path of relay 2HB. Ground on lead 2HP has been removed by the operator's position equipment, and relay 2HB does not reoperate. Relay 3HC restores, closes lead 3T to the number one winding of relay 3HC, and closes ground to rotary switch 2HS through its interrupter springs. Rotary switch 2HS steps self-interrupted to its normal position. The off-normal springs restore and remove the ground potential from the magnet of the rotary switch 2HS. Relay 3PR restores and prepares a ground to lead 2RA. Closure of ground to lead 2HR signalled completion of keying to the ticketer. Ground is removed from lead 5HH. Relay 4BB restores, opens the holding path to relay 4BC, opens the holding path to relay 5LD, prepares to close holding ground to lead 5AL2, prepares removal of resistance battery from lead 5AL1, transfers the supervisory lamp from ground to 120 IPM and prepares a circuit to relay 4GA. Relay 4BC restores, prepares a circuit to relay 4BA, opens the circuit to relay 4BD, and prepares its own operating path. Relay 5LD restores, prepares a circuit to the number one winding of relay 4FR and removes the short circuit from relay 5LP. Relay 4BD restores, closes relay 4GA and 4GC across leads 3T and 3R, removes resistance ground from the S windings of relays 5TN, 5RN, 5TS and 5RS, closes ground to lead 5AL2, opens leads 5FB1 from lead 5FB2, removes resistance battery from lead 5AL1, and removes ground from lead 5HP. Relay 4GA operates and closes a circuit to relay 4GB. Relay 4GB operates, removes 120 IPM from the supervisory lamp, closes resistance battery potential from lead 5AL1, removes ground from lead 5AL2, and closes lead 5FB1 to lead 5FB2. This circuit is now at normal.

FORCED RELEASE

Should the operator experience difficulty and wish to be released from the connection, the start and error keys are depressed simultaneously to close ground potential to leads 2HE and 2HR. Relays 3HE and 3HR operate, and close +50 volt potential to leads 3T and 3R and close a circuit to relay 3HD. Relay 3HR, in addition, closes a holding ground to relay 2HB. Relay 3HD operates, opens the operating path to relay 2HB, prepares for the removal of holding ground to relay 2HB and close a multiple holding path to relay 3HC. Relays 5RS, 5RL, 5TS and 5TL operate and close ground to leads 5HE and 5HR. Ground from the operator's trunk circuit is closed to lead 5LP. Relay 5LD is short circuited, restores, opens the short circuit to relay 5LP and prepares to close lead 3T to the number one winding of relay 4FR. Relay 5LP operates, closes ground to relay 5TL and the P1 windings of relays 5TN and 5TS and closes the number one winding of relay 4FR to lead 3T. Relay 4FR operates on ground through lead 3T, locks, and further closes ground to lead 5HR. When the operator releases the error and start keys, relays 3HE and 3HR restore. +50 volt potential is removed from leads 3T and 3R, and relay 3HR opens the holding ground to relay 2HB. Relay 2HB restores, closes relay 2HA to lead 3R, opens the circuit to lead 2LP, opens a multiple holding path to lead 3HC, opens the holding path to relay 3PR, prepares its own operating path, further opens ground from lead 2RA, removes ground from lead 2HH, and opens the holding path to relay 3HD. Relay 3PR restores and prepares a ground circuit to lead 2RA. Relay 3HD restores, opens the holding path to relay 3HC and prepares an operating circuit to relay 2HB. Relay 3HC restores, prepares a ground circuit to lead 2LP, closes its own number one winding to lead 3T and closes a circuit to rotary switch 2HS to its interrupter springs. Switch 2HS steps self-interrupted to its normal position and the off-normal springs restore.

Relays 5RS, 5RL, 5TS and 5TL restore when the +50 volt potential is removed from leads 3T and 3R and remove ground potential from lead 5HE. Ground from the operator's trunk circuit is removed from lead 5HH. Relay 4BB restores, prepares for the closure of the winding of relay 4GA to lead 3R and the winding of relay 4GC to lead 3T, opens the holding ground from relays 4FR and 4BC, prepares a ground circuit to lead 5AL2, removes resistance ground from lead 5LP, prepares the opening to lead 5FB1 from lead 5FB2 and prepares the removal of resistance battery from lead 5AL1. Relay 4BC restores, prepares its own operating path, and opens the circuit to relay 4BD. Relay 5LP restores, transfers lead 3T from the number one winding of relay 4FR to 5TL and removes ground from relay 5TL and the P1 windings of relays 5TN and 5TS. Relay 4FR restores and removes the ground from lead 5HR. Relay 4BD restores, connects relay 4GA across leads 3T and 3R, removes the resistance ground from the S windings of relays 5TN, 5RN, 5TS and 5RS, closes ground to lead 5AL2, opens lead 5FB1 from lead 5FB2, removes the resistance battery from lead 5AL1 and transfers the supervisory lamp from ground potential to 120 i.p.m. Relays 4GA and 4GB operate as explained in the preceding section. This circuit is now at normal.

If the operator meant to depress the error and start key at the same time but, by mistake, depressed key error before key start, the operation will be as follows: relay 3HF will operate and lock before relay 3HD operates. Relay 3HF opens the holding path to relay 3HC, and relay 3HC restores. When both keys are depressed, relay 3HD will operate and close battery through the number two winding of relay 3PS to the number two winding of relay 3HC. Relay 3HC will reoperate. The rest of the operation is as explained above with the exception that relay 3HF restores when rotary switch 2HS returns to normal and its off-normal springs operate.

ERROR IN KEYING

If the operator depresses the error key during keying, ground is closed to lead 2HE. Relay 3HE operates, closes +50 volt potential to lead 3R and closes a circuit to relay 3HF. Relay 3HF operates, opens the circuit to relay 3HC, closes a circuit to rotary switch 2HS and closes ground to lead 2RA. The +50 volt potential on lead 3R operates relays 5RL and 5RS which closes ground potential to lead 5HE. When ground is removed from lead 2HE relays 3HE, 5RL, and 5RS restore. Ground is removed from lead 5HE. Ground from the operator's trunk circuit is removed from lead 5HH. Relays 4BB, 4BC, 4BD, 5LD, 2HB, 3HC and 3PR and switch 2HS restore as explained in the penultimate section. Relays 4GA, 4GB and 4GC operate as explained in the last-mentioned section. Relay 3HF restores when rotary switch 2HS has returned to normal. This circuit will again be seized as explained in the preceding sections.

CONTROL TRUNK ALARM

If for any reason the trunk loop (3T, 3R) is opened or the busy key is operated, the circuit is opened to relay 4GA. Relay 4GA restores and opens the circuit to relay 4GB. Relay 4GB restores and closes ground potential to the trunk alarm through lead 5AL2. The trunk alarm relay restores and ground potential is removed from lead 5AL2.

What is claimed is:

1. In a toll ticketing telephone system wherein subscribers lines in an automatic exchange complete local automatic connections in their exchange but are restricted from completing inter-exchange calls over trunk lines to subscribers lines in distant exchanges until their station identity is known to the toll ticketing repeater, an operator trunk line comprising two conductors connecting said exchange with an operator's position at a distant exchange, means including a toll ticketing repeater in said first exchange for seizing said trunk line and for signalling the operator thereover in response to the intiation of an inter-exchange call from a subscribers line in said exchange, said trunk line terminated at both ends with composite signalling equipment and trunk circuits, means controlled over said two conductors of said trunk line by the operator for successively applying a predetermined potential to each of said conductors from said second exchange to simultaneously forward each digit of said calling subscribers directory number to thereby cause said toll ticketing repeater to complete a call to a distant exchange subscriber line as dialed by a calling subscriber.

2. In a toll ticketing telephone system wherein subscribers lines in a first automatic exchange complete local automatic connections in their exchange but are restricted from completing inter-exchange calls over trunk lines to subscribers lines in distant exchanges until their station identity is known to the toll ticketing repeater, an operator trunk line comprising two conductors connecting said exchange with an oerator's position at a distant exchange, means including a toll ticketing repeater in said first exchange for seizing said trunk line and for signalling the operator thereover in response to the initiation of an inter-exchange call from a subscribers line in said exchange, said trunk line terminated at both ends with composite signalling equipment providing two signal leads and a first and second trunk circuits at said automatic and said operator exchange respectively, said first trunk circuit in said first exchange connecting said composite equipment signal leads and transmission path to said toll ticketing repeater and said second trunk circuit connecting said composite equipment signal leads and transmission path to said operator position, said first trunk circuit impressing a ground potential to a first of said two conductors to signal the operator thereover of the initiation of an inter-exchange call from a subscribers line in said first exchange, said second trunk circuit impressing a ground potential to the second of said two conductors to signal the first trunk circuit upon the operator accepting said call, means in said second trunk circuit responsive to said ground potential upon said second conductor to signal said subscriber by the application of a tone to the calling line, said operator upon obtaining the calling station directory number orally, keying said number into said second trunk circuit, said second trunk circuit forwarding said keyed directory number as a series of positive and negative potentials applied to said signal leads to said first trunk circuit, said first trunk circuit translating said potentials into a modified binary code and forwarding them to said toll ticketing repeater, said second trunk circuit signalling said first trunk circuit by the application of high positive potential to said first trunk circuit, means in said first trunk circuit upon receipt of said high positive potential to said first conductor signalling said toll ticketing repeater that said calling station directory number sending is complete and to complete the initiated call to the called subscriber and that said operator and associated trunk circuits are disconnecting themselves therefrom.

3. A toll ticketing telephone system wherein subscribers lines in an automatic exchange complete local automatic connections in their exchange but are restricted from completing inter-exchange calls over trunk lines to subscribers lines in distant exchanges until their station identity is known to the toll ticketing repeater, an operator trunk line comprising two conductors connecting said exchange with an operator's position including a keyset at a distant exchange, said trunk line terminating in composite equipment in each exchange and a first trunk circuit in said automatic exchange and a second trunk circuit in said manual exchange accessible to said operator position, means including a toll ticketing repeater in said first exchange for seizing said first trunk circuit, means in sid first trunk circuit for impressing a ground potential to a first of said two conductors to signal the operator thereover of the initiation of an inter-exchange call from a subscribers line in said first exchange, a first means in said second trunk circuit effective upon said operator answering said signal to extend a talking path through said first trunk circuit whereby said operator may orally request said calling station identity, a second means in said second trunk circuit responsive to the depression of the number 7 key of said keyset for impressing a low negative potential to said second of said two conductors, second means in said first trunk circuit responsive to said low negative potential to forward a codel indication of the digit 7 to the repeater.

4. In a toll ticketing telephone system as claimed in claim 3, a third means in said second trunk circuit responsive to the depression of the number 8 key of said keyset for impressing a low positive potential to said second of said two conductors, a third means in said first trunk circuit responsive to said low positive potential to forward a codel indication of the digit 8 to said repeater.

5. In a toll ticketing telephone system as claimed in claim 4, a fourth means in said second trunk circuit responsive to the depression of the number 9 key of said keyset for impressing a low negative potential to said first of said two conductors, a fourth means in said first trunk circuit responsive to said low negative potential to forward a codel indication of the digit 9 to said repeater.

6. In a toll ticketing telephone system as claimed in claim 5, a fifth means in said second trunk circuit responsive to the depression of the number 0 key of said keyset for impressing a low positive potential to said first of said two conductors, a fifth means in said first trunk circuit responsive to said low positive potential to forward a codel indication of the digit 0 to said repeater.

7. In a toll ticketing telephone system as claimed in claim 6, a sixth means in said second trunk circuit responsive to the depression of the error key of said keyset for impressing a high positive potential to said second of said two conductors, a sixth means in said first trunk circuit responsive to said high positive potential to forward a codel error indication to said repeater.

8. In a toll ticketing telephone system as claimed in claim 7, a seventh means in said second trunk circuit responsive to the depresion of the start key of said keyset for impressing a high positive potential to said first of said two conductors, a seventh means in said first trunk circuit responsive to said high positive potential to forward a codel error indication to said repeater.

9. In a toll ticketing telephone system as claimed in claim 8, an eighth means in said trunk circuit responsive to the depression of the accept key of said keyset for impressing a high positive potential to said second of said two conductors, an eighth means in said first trunk circuit responsive to said high positive potential to forward an accept indication to said ticketer.

10. In a toll ticketing telephone system as claimed in claim 9, a ninth means in said trunk circuit responsive to the depression of the number 1 key of said keyset for impressing a high negative potential to said second of said two conductors, a ninth means in said first trunk circuit responsive to said high negative potential to forward a codel indication of the digit 1 to said repeater.

11. In a toll ticketing telephone system as claimed in claim 10, a tenth means in said trunk circuit responsive to the depression of the number 2 key of said keyset for impressing a low negative potential to said first conductor and a low negative potential to said second conductor of said two conductors, a tenth means in said first trunk circuit responsive to said two potentials to forward a codel indication of the digit 2 to said repeater.

12. In a toll ticketing telephone system as claimed in claim 11, an eleventh means in said trunk circuit responsive to the depression of the number 3 key of said keyset for impressing a low positive potential to said first conductor and a low negative potential to said second conductor of said two conductors, an eleventh means in said first trunk circuit responsive to said potentials to forward a codel indication of the digit 3 to said repeater.

13. In a toll ticketing telephone system as claimed in claim 12, a twelfth means in said second trunk circuit responsive to the depression of the number 4 key of said keyset for impressing a low positive potential to said second conductor of said two conductors, a twelfth means in said first trunk circuit responsive to said potentials to forward a codel indication of the digit 4 to said repeater.

14. In a toll ticketing telephone system as claimed in claim 13, a thirteenth means in said second trunk circuit responsive to the depression of the number 5 key of said keyset for impressing a low positive potential to both said conductors, a thirteenth means in said first trunk circuit responsive to said potentials to forward a codel indication of the digit 5 to said repeater.

15. In a toll ticketing telephone system as claimed in claim 14, a fourteenth means in said second trunk circuit responsive to the depression of the number 6 key of said keyset for impressing a high negative potential to said first of said two conductors, a fourteenth means in said first trunk circuit responsive to said high negative potential to forward a codel indication of the digit 6 to said repeater.

References Cited in the file of this patent

UNITED STATES PATENTS

| | | |
|---|---|---|
| 2,535,511 | Ostline | Dec. 26, 1950 |
| 2,581,900 | Baker | Jan. 8, 1952 |